Aug. 19, 1930.   R. D. GILMORE   1,773,529
APPARATUS FOR TREATING COFFEE

Filed Aug. 18, 1927

Inventor
Robert D. Gilmore
by Wright, Brown, Quinby & May
Attys.

Patented Aug. 19, 1930

1,773,529

UNITED STATES PATENT OFFICE

ROBERT D. GILMORE, OF NEWTON, MASSACHUSETTS

APPARATUS FOR TREATING COFFEE

Application filed August 18, 1927. Serial No. 213,952.

It has been the experience of those having to do with lunch rooms and the like, that if coffee, after having been made, is permitted to stand in the urn, particularly when kept hot, its flavor and color rapidly deteriorate, the coffee becoming bitter and dark. For this reason, it has been customary to make the coffee in small quantities and relatively often which, of course, increases the time and labor necessarily expended in its preparation and consequently, adds to its cost. Even then, there is often unavoidable waste due to deterioration.

The present invention has for its object the avoidance of this deterioration so that the coffee can be made in large quantities and less often without impairing its quality. Extensive investigation has led me to the belief that deterioration of the coffee, after is has been made up, is largely, if not wholly, due to oxidation of the tannins which the coffee contains, such oxidation being promoted when the coffee is maintained hot, due to the vaporization and condensation in intimate contact with the air thereabove in the urn which of course increases in amount as the coffee is drawn off for use. Whether or not this is the correct reason, I have discovered that the deterioration may be prevented, or at least very greatly retarded, by preventing the coffee, after it has been made up, from coming into contact with air. This may be done quite readily even when the coffee is left in the urn, and when the urn is not completely filled, as for example, by covering the surface of the coffee with any suitable medium which will float thereon so as to descend with the coffee as the latter is drawn off as required, so that the body of coffee is maintained out of contact with air as long as any coffee remains in the urn.

Figure 1:
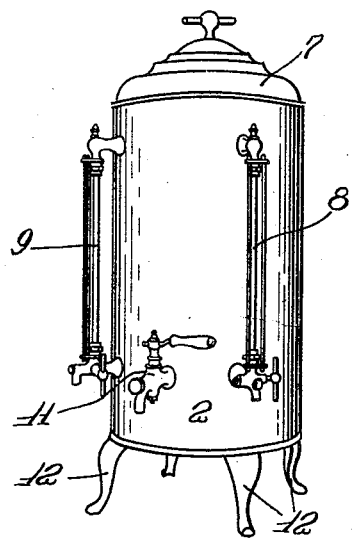
Figure 2:
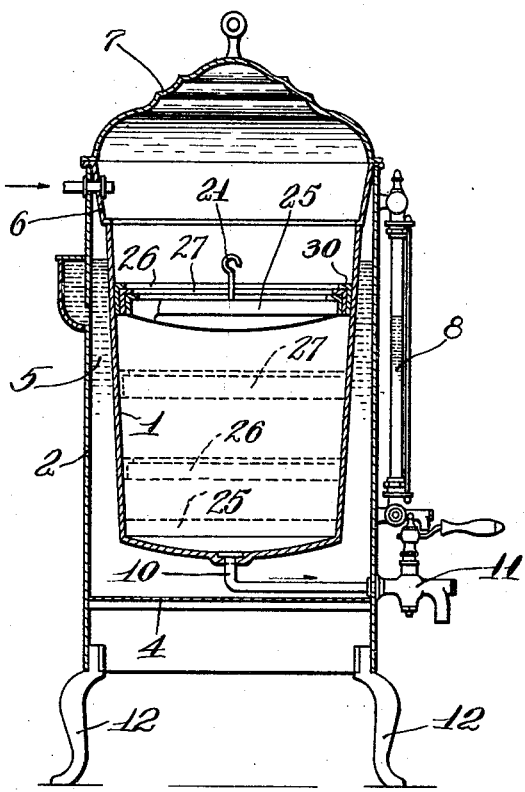

For a more complete understanding of this invention, reference may be had to the accompanying drawings in which Figure 1 shows one type of urn commonly employed for making coffee and Figure 2 is an enlarged, vertical section of the same.

Referring to these drawings, it will be seen that the urn comprises a double walled or jacketed receptacle, having inner and outer wall portions 1 and 2, and bases 3 and 4, respectively, these walls and bases confining between them a jacket for containing hot water as at 5. The upper end of the jacket is closed off as by means of the substantially conical wall 6 to provide an enlarged upper portion for the inner container which may be covered by a suitable top or cover 7 bridging the water jacket portion. At 8 is shown a sight-glass to indicate the level of water in the water jacket, and at 9 is indicated a similar glass to indicate the level of coffee within the inner container. Extending through the base 3 of the inner container is a pipe 10 leading to a drawoff valve 11 by which the coffee may be drawn off as required. The urn may be supported on the feet 12 and may be heated in any suitable manner, as for example, by means of a gas flame positioned beneath the base 4.

So far, the apparatus is the conventional form of coffee urn. When the coffee is to be made, the ground coffee beans are placed in a suitable strainer, or basket, which is let down into the hot water in the inner receptacle for a sufficient length of time to prepare the coffee of the desired strength. The strainer and the coffee grounds may then be removed. It is at this point that the method of this invention is brought into operation. The body of coffee within the inner receptacle is covered with some agent or medium which prevents its contact with the air in the receptacle thereabove. For example, a float may be placed on the surface of the coffee so as to descend with this surface as the coffee is drawn off, this float being so formed as to cover substantially the entire surface of the coffee so as to maintain it out of contact with he air above.

This float may be made in any desired manner and of any suitable material, as for example, of metal in hollow form, or as a solid block of cork or similar material. In place of the rigid float, a suitable liquid may be used such as an oil, or paraffin wax which will form a coating on the surface of the coffee and descend with this surface as the coffee is drawn off. Preferably, however, a float of solid material is employed as this cannot in any way contaminate the coffee or clog the draw-off valve or pipe when the coffee has been removed.

In many cases, and as shown in Fig. 2, it will be found that the side walls of the coffee-containing receptacle slope downwardly in which case, of course, it would be impossible to use a float of sufficiently large diameter to substantially completely cover the coffee when there is a large amount of coffee in the urn as such a float would be too large to pass downwardly into the more constricted lower portion of the receptacle. Where this is the case, the float 25 may be made as shown in Figure 2 of a diameter substantially equal to the smallest diameter of the coffee receptacle. It may be surrounded by a series of rings 26, 27 and 28 nesting in each other in such a way that when all the rings are in place the float and rings are of sufficient diameter to closely engage the wall of the coffee receptacle at its upper portion, and as the float descends these rings are successively caught and held by the sides of the receptacle, permitting the next smaller ring and the float to descend together to such a point that the next smaller ring is also held by the receptacle walls. The positions in which the rings 26 and 28 are left behind as the float descends are shown in dotted lines in Figure 2. As shown, the rings may each be provided with an inwardly extending flange 30 at its upper end which is engaged by the float or the next smaller ring as the float is moved upwardly in the receptacle so that the collecting and depositing of the rings as the float moves up or down is done automatically. With this arrangement, it can be seen that substantially the entire surface of the coffee is covered at any level of coffee in the receptacle. As it is usual practice to make the base of the coffee receptacle downwardly dished the lower face of the float may be similarly formed so that it may descend and finally rest on this base when all the coffee has been removed from the urn. Thus the coffee is excluded and protected from access of air as long as it remains in the urn. If desired this float may be provided with a hook 21 at its upper end by which it may be lifted in removing it or replacing it in the coffee receptacle.

While this invention has been described with reference to the making of coffee in large quantities, as for lunch room use, it may equally well be applied to the making of coffee for home use in relatively small quantities, as in a coffee pot, and with similarly good results.

Having thus described the embodiments of this invention, it should be evident to those skilled in the art that various changes and modifications may be made therein without departing from its spirit or scope as defined by the appended claims.

I claim:
1. The combination with a coffee making receptacle tapering downwardly, of a float of substantially the cross sectional area of said receptacle at its lower end, and a series of rings arranged to nest one within the other and surrounding said float, said rings being adapted to be successively retained by the walls of said receptacle at different elevations as said float descends, said rings and float together covering substantially the entire surface of a body of coffee in said receptacle supporting said float.

2. The combination with a coffee making receptacle tapering downwardly, of a float of substantially the cross sectional area of said receptacle at its lower end, and a series of rings nesting one within another and surrounding said float, each of said rings having an inwardly directed marginal flange at its upper end constructed to overlie the ring next within or the float, whereby said rings may be successively retained by the walls of said receptacle at different elevations as the float descends and are successively picked up from their retained positions as the float rises to move upwardly therewith, said rings and float together covering substantially the entire surface of a body of coffee within said receptacle supporting said float.

In testimony whereof I have affixed my signature.

ROBERT D. GILMORE.